Patented Dec. 11, 1934

1,983,732

UNITED STATES PATENT OFFICE 1,983,732

CAOUTCHOUC-LIKE MATERIAL

Robert Beyer, Brooklyn, N. Y., assignor to Robert Beyer Corporation, a corporation of New York No Drawing. Application January 30, 1931
Serial No. 512,484

21 Claims. (Cl. 106—23)

This invention relates to caoutchouc-like material and has for its object the provision, as a new article of manufacture, of a novel caoutchouc-like material and a method of making the same. More particularly, the invention aims to provide a novel caoutchouc-like conversion product of a carbohydrate, such as starch, displaying physical characteristics similar to natural caoutchouc, and a method of making such material.

I have discovered that a carbohydrate such as starch, is converted by an aldehyde, preferably formaldehyde, in the presence of an appropriate catalyst into caoutchouc-like material which behaves in substantially all important respects like natural caoutchouc, and which vulcanizes with the customary compounding agents to form a vulcanized product possessing substantially the characteristic properties, and to substantially the same degree, of vulcanized natural caoutchouc. The method of my present invention, based on that discovery, contemplates a process of converting a carbohydrate, like starch, to such caoutchouc-like material.

The method of the invention is characterized by subjecting starch to the action of an aldehyde, preferably formaldehyde, in the presence of a suitable catalyst, preferably metallic magnesium. I have found an aqueous solution of formaldehyde containing about 30% formaldehyde ($CH_2O$) admirably adapted for the practice of the invention. It is important that the starch grains be thoroughly impregnated with the formaldehyde. As a consequence of proper impregnation, the starch grains swell and form a mucilaginous mass. Conversion of the carbohydrate of the starch is promoted by heating to a moderate temperature (say 150–175° F.) and by pressures considerably in excess of the atmospheric pressure. In the course of the conversion, the carbohydrate is largely, if not entirely, converted to a hydrocarbon, and the aldehyde is (in part at least) oxidized, formaldehyde being oxidized to formic acid. The conversion product is a mucilaginous mass impregnated with formic acid, or the like.

The conversion product may be freed of formic acid and excess formaldehyde by distillation under a gentle heat, or by working on rubber rolls, with or without washing with water. The resulting conversion product is a hydrocarbon and may be vulcanized like natural rubber.

It is my preferred practice to subject the product obtained by the conversion just described to further treatment in the presence of a metallic soap, preferably aluminum palmitate. In order to secure uniform dispersion of the metallic soap, it is preferable to dissolve it in an appropriate solvent, such as benzol. The metallic soap may advantageously be added to the conversion product while working the latter on the rolls of a rubber mill, after the removal of the major portion of the formic acid. The resulting product is a caoutchouc-like material closely resembling natural rubber.

I now give a specific example of the practice of the invention, although it is to be understood that this example is purely illustrative and in no sense restrictive. The materials and proportions specified are those with which I have secured very satisfactory results in actual practice.

The conversion process is preferably carried out in a mixing device (such as an ordinary dough-mixer) adapted to be hermetically closed and provided with means for establishing both a high vacuum and a considerable pressure within the mixing chamber. An appropriate amount of dry starch (potato, cassava etc.) is placed in the mixing chamber. An appropriate catalyst is added to the starch. It is my present preferred practice to use metallic magnesium as the catalyst. The amount of the catalyst seems unimportant, the presence of a small piece of magnesium metal serving the purpose. The mixing chamber is then closed and as high a vacuum as possible is established therein. The mixing chamber is now connected to a source of formaldehyde which is allowed to slowly enter the chamber, being drawn in through a suitably restricted opening in consequence of the reduced pressure within the chamber. The mixing mechanism is continuously operated and an intimate mixing of the starch and formaldehyde is effected.

When as much formaldehyde has entered the mixing chamber as can be drawn therein by the reduced pressure, additional formaldehyde is forced into the chamber under pressure, say until a pressure of about 30–40 pounds per square inch has been established within the chamber. About 2 to 3 parts by weight of a 30% aqueous formaldehyde solution for each one part by weight of dry starch gives satisfactory results.

The vacuum and subsequent pressure insure thorough and complete penetration of the starch grains with the formaldehyde. Mixing is continued until a homogeneous mucilaginous or pasty mass has been formed of the starch and formaldehyde. The contents of the mixing chamber is then gently heated with continuous mixing. Heat is advantageously applied through the medium of a steam jacket. As heating proceeds, the pressure within the mixing chamber rises. Satisfactory results are attained by heating the contents of the mixing chamber to a temperature of about 150–175° F. at an ultimate pressure of about 80 pounds per square inch. The heating and mixing under the considerable pressure should continue for at least one hour, and preferably somewhat longer.

The reaction mass within the mixing chamber is allowed to cool, without opening the chamber, to approximately room temperature. In the course of this cooling the pressure within the chamber drops to slightly above atmospheric pressure. The resulting reaction product is a mucilaginous appearing mass impregnated with formic acid, or other equivalent product of the conversion.

The reaction product is subjected to appropriate treatment for the removal and recovery of the formic acid therein. This may be effected by heating the product to distill and condense the formic acid. The product, thus substantially freed of formic acid, is a caoutchouc-like hydrocarbon which may be vulcanized much like natural caoutchouc. Its caoutchouc-like properties are, however, substantially improved by treatment with a metallic soap.

The treatment of the caoutchouc-like material with a metallic soap may be conveniently carried out on the rolls of a rubber mill. The mass is placed on the rolls and a suitable amount of the metallic soap added thereto and worked therein by the action of the rollers. It is my preferred practice to use aluminum palmitate dissolved in benzol. One pound of aluminum palmitate dissolved in one gallon of benzol gives a suitable mixture for the purpose. One to two parts by weight of aluminum palmitate per ten parts by weight of starch originally used gives satisfactory results.

As the metallic soap works into the material on the rubber rolls, the material behaves much like natural caoutchouc. The material is sheeted out from the rolls in thin sheets and exposed to appropriate conditions for drying. The resulting caoutchouc-like material is then ready for compounding and vulcanization.

It is my present belief that the action of the formaldehyde on the starch, in the presence of the magnesium catalyst, reduces the carbohydrate of the starch to a hydrocarbon and oxidizes the formaldehyde to formic acid. The hydrocarbon, initially resulting from the reduction or conversion of the carbohydrate, appears to be in the nature of isoprene (methylbutadiene). It appears that a considerable polymerization of the initial hydrocarbon to the hydrocarbon molecule of caoutchouc takes place in the mixing chamber. It is probable that complete polymerization can be effected at this stage. It is, however, my belief that the completion of polymerization is more satisfactorily accomplished by treatment with a metallic soap, preferably aluminum palmitate, as hereinbefore described.

While it is now my preferred practice to use magnesium as the catalyst, other catalytic agents are available. I have discovered that the reaction product derived from formaldehyde varies with different catalysts. Thus, the use of aluminum chloride as the catalyst results in the production of acetic acid instead of formic acid, and the use of nickel results in the production of oxalic acid. Calcium chloride may be advantageously used to promote the catalytic action, especially of nickel.

I claim:

1. The method of converting starch to a caoutchouc-like hydrocarbon which comprises thoroughly impregnating the starch with formaldehyde, subjecting the resulting mass to heat under pressure in the presence of a catalyst, separating the resulting caoutchouc-like conversion product from the other products of the conversion operation, and treating the caoutchouc-like conversion product with a water-insoluble metallic soap.

2. The method of converting starch to a caoutchouc-like hydrocarbon which comprises thoroughly impregnating the starch with formaldehyde, subjecting the resulting mass to moderate heat under pressure in the presence of a catalyst, separating the resulting caoutchouc-like conversion product from the other products of the conversion operation, and treating the caoutchouc-like conversion product with a water-insoluble metallic soap dissolved in an organic solvent.

3. The method of converting starch to a caoutchouc-like hydrocarbon which comprises thoroughly impregnating the starch with formaldehyde, subjecting the resulting mass to moderate heat under pressure in the presence of magnesium, separating the resulting caoutchouc-like conversion product from the other products of the conversion operation, and treating the caoutchouc-like conversion product with a water-insoluble metallic soap dissolved in a hydrocarbon solvent.

4. The method of converting starch to a caoutchouc-like hydrocarbon which comprises thoroughly impregnating the starch with formaldehyde, subjecting the resulting mass to moderate heat under pressure in the presence of magnesium, separating the resulting caoutchouc-like conversion product from the other products of the conversion operation, and treating the caoutchouc-like conversion product with aluminum palmitate.

5. The method of converting starch to a caoutchouc-like hydrocarbon which comprises thoroughly impregnating the starch with formaldehyde, subjecting the resulting mass to moderate heat under pressure in the presence of a catalyst, separating the resulting caoutchouc-like conversion product from the other products of the conversion operation, and treating the caoutchouc-like conversion product with aluminum palmitate in solution.

6. The method of converting starch to a caoutchouc-like material which comprises subjecting the starch to a vacuum, thoroughly impregnating the starch while maintained under the vacuum with formaldehyde, subjecting the resulting mass to moderate heat under pressure in the presence of a catalyst, and treating the resulting caoutchouc-like conversion product with a water-insoluble metallic soap.

7. The method of converting starch to a caoutchouc-like material which comprises subjecting the starch to a vacuum, thoroughly impregnating the starch while maintained under the vacuum with formaldehyde, subjecting the resulting mass to moderate heat under pressure in the presence of a catalyst, and treating the resulting caoutchouc-like conversion product with a water-insoluble metallic soap.

8. The method of converting starch to a caoutchouc-like material which comprises subjecting the starch to a vacuum, thoroughly impregnating the starch while maintained under the vacuum with formaldehyde, subjecting the resulting mass to moderate heat under pressure in the presence of magnesium, and treating the resulting caoutchouc-like conversion product with a water-insoluble metallic soap.

9. The method of converting starch to a caoutchouc-like material which comprises subjecting the starch to a vacuum, thoroughly impregnating the starch while maintained under the vacuum with formaldehyde, subjecting the resulting mass to moderate heat under pressure in the presence of magnesium, and treating the resulting caoutchouc-like conversion product with aluminum palmitate.

10. The method of converting starch to a caoutchouc-like material which comprises subjecting the starch to a vacuum, thoroughly impregnating the starch while maintained under the vacuum with formaldehyde, subjecting the resulting mass to moderate heat under pressure in the presence of a catalyst, and treating the resulting caoutchouc-like conversion product with aluminum palmitate.

11. The method of converting starch to a caoutchouc-like material which comprises subjecting the starch to a vacuum in a hermetically sealed mixing chamber, introducing formaldehyde into the mixing chamber with constant mixing of the resulting mass until a pressure in excess of the atmospheric pressure has been established within the chamber, subjecting the resulting mass to moderate heat under pressure in the presence of a catalyst, and treating the resulting caoutchouc-like conversion product with a water-insoluble metallic soap.

12. The method of converting starch to a caoutchouc-like material which comprises subjecting the starch to a vacuum in a hermetically sealed mixing chamber, introducing formaldehyde into the mixing chamber with constant mixing of the resulting mass until a pressure in excess of the atmospheric pressure has been established within the chamber, subjecting the resulting mass to moderate heat under pressure in the presence of magnesium and treating the resulting caoutchouc-like conversion product with a water-insoluble metallic soap.

13. The method of converting starch to a caoutchouc-like material which comprises subjecting the starch to a vacuum in a hermetically closed mixing chamber, introducing formaldehyde into the mixing chamber with constant mixing of the resulting mass until a pressure in excess of the atmospheric pressure has been established within the chamber, subjecting the resulting mass to moderate heat under pressure in the presence of magnesium, and treating the resulting caoutchouc-like conversion product with aluminum palmitate dissolved in an organic solvent.

14. The method of converting starch to a caoutchouc-like material which comprises subjecting the starch to a vacuum in a hermetically closed mixing chamber, introducing formaldehyde into the mixing chamber with constant mixing of the resulting mass until a pressure in excess of the atmospheric pressure has been established within the chamber, subjecting the resulting mass to moderate heat under pressure in the presence of magnesium, and treating the resulting caoutchouc-like conversion products with aluminum palmitate.

15. The method of converting starch to a caoutchouc-like material characterized by carrying out the conversion treatment of the starch in the presence of formaldehyde and a catalyst selected from the group consisting of magnesium and nickel.

16. The method of converting starch to a caoutchouc-like material characterized by carrying out the conversion treatment of the starch in the presence of formaldehyde and magnesium whereby the carbohydrate is converted to hydrocarbon.

17. The method of converting starch to a caoutchouc-like material characterized by carrying out the conversion treatment of the starch in the presence of formaldehyde and magnesium under a pressure in excess of the atmospheric pressure and under a moderate condition of heat.

18. The method of converting starch to a caoutchouc-like material characterized by carrying out the conversion treatment of the starch in the presence of formaldehyde and magnesium under a pressure considerably in excess of the atmospheric pressure and under a moderate condition of heat adapted to convert the carbohydrate to hydrocarbon.

19. The method of converting starch to a caoutchouc-like material which comprises subjecting the starch to a vacuum, thoroughly impregnating the starch while maintained under the vacuum with formaldehyde, and subjecting the resulting mass to moderate heat under pressure in the presence of a catalyst whereby the carbohydrate is converted to hydrocarbon.

20. The method of converting starch to a caoutchouc-like material which comprises subjecting the starch to a vacuum, thoroughly impregnating the starch while maintained under the vacuum with formaldehyde, and subjecting the resulting mass to moderate heat under pressure in the presence of a catalyst selected from the group consisting of magnesium and nickel.

21. The method of converting starch to a caoutchouc-like material which comprises subjecting the starch to a vacuum, thoroughly impregnating the starch while maintained under the vacuum with formaldehyde, and subjecting the resulting mass to moderate heat under pressure in the presence of magnesium.

ROBERT BEYER.